United States Patent [19]
Oki

[11] Patent Number: 4,662,978
[45] Date of Patent: May 5, 1987

[54] PACKED BAG TRANSVERSE SEALING MECHANISM

[75] Inventor: Yasuo Oki, Tomioka, Japan
[73] Assignee: Orihiro Co., Ltd., Japan
[21] Appl. No.: 798,947
[22] Filed: Nov. 18, 1985

[30] Foreign Application Priority Data

Aug. 15, 1985 [JP] Japan ............................... 60-178564

[51] Int. Cl.⁴ ........................................... B32B 31/18
[52] U.S. Cl. ................................... 156/498; 156/250; 156/251; 156/510; 156/515; 156/530; 53/477; 493/189; 493/190; 493/203; 493/209
[58] Field of Search .............. 156/250, 251, 510, 515, 156/530, 498; 53/477; 493/189, 190, 203, 209

[56] References Cited
U.S. PATENT DOCUMENTS 2,627,213  2/1953  Nye ..................................... 156/251
3,616,087  10/1971  Henry et al. ......................... 156/251

FOREIGN PATENT DOCUMENTS 80426  7/1981  Japan ................................... 156/251
984124  2/1965  United Kingdom ................ 156/251

Primary Examiner—Caleb Weston
Attorney, Agent, or Firm—McGlew and Tuttle

[57] ABSTRACT

This invention relates to a transverse sealing mechanism for use in producing bag-packed products by packing products in tubular film. The transverse sealing mechanism comprises compression-and-heat sealing means and compression-cooling and compression-cutting means disposed immediately below said sealing means, each of these means having a mechanism which can increase its compressive force infinitely. The packed bag transverse sealing mechanism provides for storing and perfect seals.

3 Claims, 9 Drawing Figures

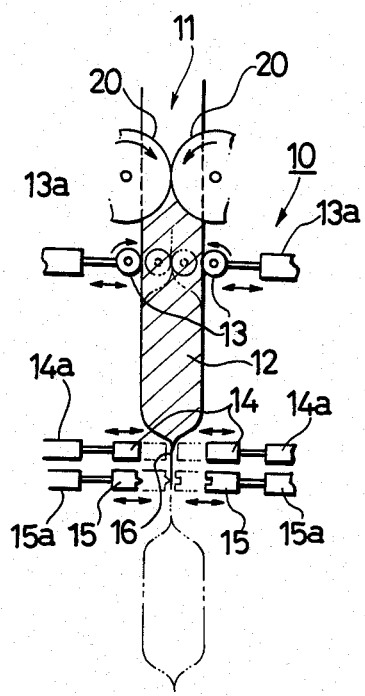
FIG.4 PRIOR ART
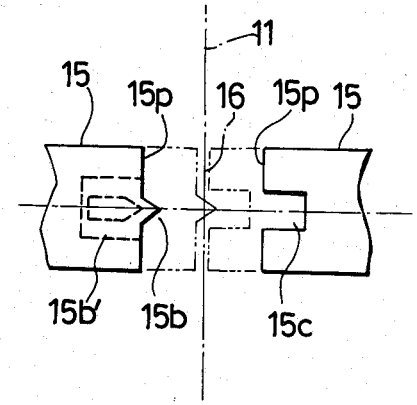
FIG.6 PRIOR ART
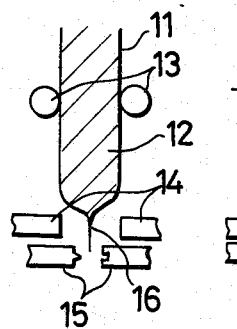
FIG.5a PRIOR ART
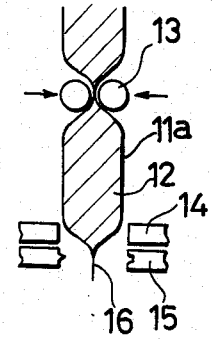
FIG.5b PRIOR ART
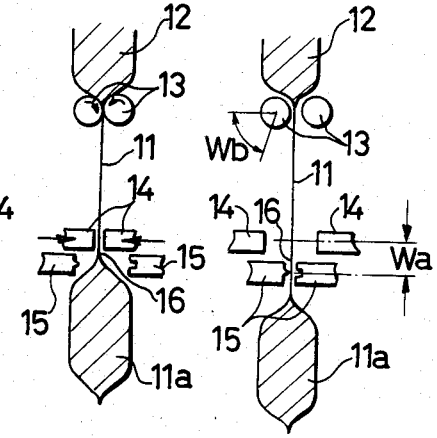
FIG.5c PRIOR ART
FIG.5d PRIOR ART

PACKED BAG TRANSVERSE SEALING MECHANISM

BACKGROUND OF THE INVENTION

1. Field of the Invention

This invention relates to a transverse sealing mechanism for packed bags to be used when packing a product in bags of tubular resin film.

2. Description of the Prior Art

Conventionally used seal-cutting devices for cutting transverse seals of packed bags of tubular resin film include, for example, one which is disclosed in Japanese Utility Model Application No. 56(81)-54552 (Japanese Utility Model Laid-open No. 57(82)-167815) filed by the applicant of this invention. This device is shown in FIG. 4, and in the device 10 are disposed feed rollers 20, 20 for feeding tubular film 11, squeeze rolls 13, 13 synchronously rotating with and underneath the feed rollers 20, 20, heat-sealing means 14, 14 spaced apart, as required for heat-sealing, from and underneath the squeeze rolls 13, 13, and cutting means 15, 15 spaced apart at a distance about equal to the width of the sealed portion 16 from and underneath the heat-sealing means 14, 14. The squeeze rolls 13, 13, heat-sealing means 14, 14, and cutting means 15, 15 are provided respectively with displacing means 13a, 14a, and 15a, such as horizontally reciprocating cylinders. A timer means is provided (not shown) for operating the heat-sealing means after the squeeze rolls 13, 13 divide the content 12 in the film 11 and rotate while being closed to send the film 11 by a certain pitch. Further means are provided (not shown) for intermittently rotating the squeeze rolls 13, 13 to allow time for opening the heat sealing means 14, 14 after heat-sealing, sending downward the sealed portion 16 by a distance equal to the width thereof and cutting apart the portion thereafter.

The operation of packing and cutting by using this device will be described hereunder with reference to FIGS. 5(a), (b), (c) and (d).

FIG. 5(a) shows the condition wherein cutting of tubular film is completed after heat-sealing and the squeeze rolls 13, 13 are opened to fill the film 11 to its bottom with a charge (liquid).

FIG. 5(b) shows the condition wherein the squeeze rolls 13, 13 are closed together to divide and pack in the bag 11a the charge 12 of an amount for one pack. Then, the heat-sealing means 14, 14 and seal-cutting means 15, 15 are in the opened condition.

FIG. 5(c) shows the condition wherein the squeeze rolls 13, 13 rotate while being closed, the tubular film 11 descends in closely collapsed condition, the charged bag 11a is stopped after passing the heat-sealing means 14, 14 to the underside thereof, and the collapsed portion 11 of the tubular film is heat-sealed by closing the heat-sealing means 14, 14.

FIG. 5(d) shows the condition wherein the heat-sealing means 14, 14 are opened after heat-sealing, the squeeze rolls 13, 13 intermittently rotate by a circumferential length Wb to send the film 11 downward by an amount Wa and stop thereafter, the cutting means 15, 15 then being closed to cut the sealed portion 16.

In this transverse cutting means 15, 15 of the prior art, as shown in a larger scale in FIG. 6, a projecting cutting blade 15b is formed on one side and a recessed section 15C is formed on the other side, the heat-sealed portion 16 of the film 11 being cut immediately after heat-sealing by the cutting blade 15b and section 15C, and at the same time the portion 16 being held therebetween and compressed by means of the pressing cylinders 15a, 15a.

In this transverse cutting means 15, 15 of the prior art, cutting operation has already started before the sealed portion 16 of the film 11 is held between and compressed by the abutting faces 15P, 15P, and the means 15 for cutting after compression does not have any cooling means so that cooling of the sealed portion is not necessarily complete. Therefore it occasionally happens that the sealed portion is not strong enough.

Further, even though cooling can be provided to the cutting means 15, 15, compression through means such as cylinders is not sufficient, and also in the case of a structure such as cams, this mechanism functions to apply a constant pressure so that the cutting means may not be able to accommodate various compressing conditions due to the thicknesses and variety of materials of film 11. Therefore the sealed portion sometimes does exhibit sufficient strength.

Furthermore in the cutting means of the prior art, the cutting operation is initiated in advance so that seal strength is not necessarily improved by compression. The method for cutting after compression also does not permit cooling to be performed completely, and the mechanism for compression cannot accommodate a variety of film materials.

BRIEF SUMMARY OF THE INVENTION

This invention intends to solve the problems in the cutting means of the prior art by providing a transverse cutting device with a compression mechanism which provides for compression pressure on transversely sealed portions of a variety of film materials and generates infinite compressive force, and with a forcibly cooled cutting device which applies infinite compressive force to the compressed, cooled and cut region of the transversely sealed portion.

BRIEF DESCRIPTION OF THE DRAWINGS

FIG. 4 is a side view of a device of the prior art, FIGS. 5(a), 5(b), 5(c) and 5(d) are side views to illustrate the operation of the device of the prior art, and FIG. 6 is a side view of cutting means of the prior art.

DETAILED DESCRIPTION OF THE INVENTION

Figure 1:
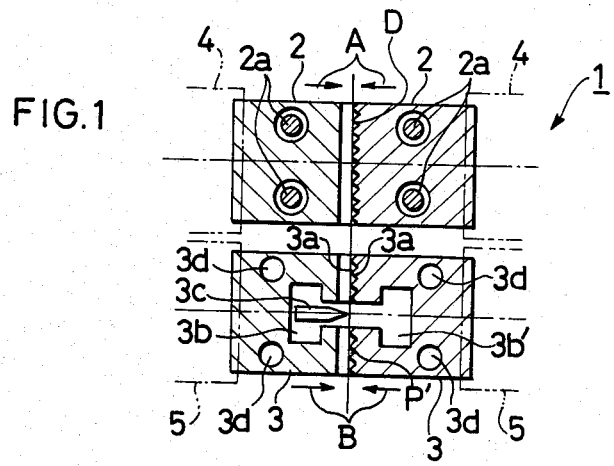
FIG. 1 is a partial detail section of an embodiment of the invention.

The invention whose objective is to solve the problems described above provides a packed bag transverse sealing mechanism to be used in a device for producing bag-packed products by charging the products in tubular film and transversely sealing the film, wherein said packed bag transverse sealing mechanism comprises a pair of compression-and-heat sealing means and a pair of compression-cooling and compression-cutting means disposed immediately below said compression-and-heat sealing means, both together being for sealing and cutting the seal of a packed bag, characterized in that said compression-and-heat sealing means and said compression-cooling and compression-cutting means are respectively provided with a pair of link-bar mechanisms by which compression force can be increased infinitely, said pair of compression-and-heat sealing means have heating media for heat-sealing, and said pair of compression-cooling and compression-cutting means have a recessed section on each of their opposing surfaces, in one recessed section being disposed a cutting blade which is adapted to project and retreat and to cut the sealed portion of said tubular film after compression-cooling. Said link-bar mechanism comprises a first link one end of which connected to a driving means and the other end of which is rotatably connected to one end of each of second and third links, the other end of said second link being rotatably supported at a fixed position and the other end of said third link being rotatably connected to either said compression-and-heat sealing means or said compression-cooling and compression-cutting means so that said second link and said third link are adapted to approach the rectilinear position from the bent position relative to each another. Further, said third link is equipped with a length adjustment means.

In the construction of the invention, the transverse seal portion is compressed and heat-sealed, then compressed and cooled, and cut under compression immediately after compression-cooling. This compression is conducted at close to infinite pressure by means of the link-bar mechanism, and yields a very strong seal regardless of the kind of film.

The invention, when a transverse seal is cut after a product is packed in tubular film and sealed, permits heat-sealing under high pressure by means of the compressing medium of the compression-and-heat sealing means, and strong compression-cooling and compression-cutting by means of the compression-cooling and compression-cutting means so that the invention improves seal strength, accommodates for a variety of film materials, and also in cooling a sealed portion it generates almost infinitely high compressive force and forced cooling, thereby ensuring further enforcement of seals, while it presents perfect sealing at the cut region of the sealed portion by means of compression-cutting.

DISCLOSURE OF THE PREFERRED EMBODIMENT

The invention will be now described hereunder by way of example with reference to the accompanying drawings. The device for packing a product in a bag of tubular resin film with a packed bag transverse sealing mechanism according to the invention is essentially the same as the one shown in FIG. 4 except for the heat-sealing means 14 and the cutting means 15 in that figure.

FIG. 1 shows a sectional view of an embodiment of the transverse sealing mechanism of the invention, said transverse sealing mechanism 1 comprising a pair of compression-and-heat-sealing means 2, 2 in the upper position thereof and a pair of compression-cooling and compression-cutting means 3, 3 immediately below the means 2, 2. Each pair of means 2, 2 and 3, 3 is movable relative to the other as shown by arrow marks A and B, respectively. The heat-sealing means 2, 2 have heating media 2a, 2a such as nickel-chrome wire heaters. The pair of compression-cooling and compression-cutting means 3, 3 are formed with recessed sections 3b, 3b' which have openings on their opposing surfaces 3a, 3a, in one recessed section 3b being installed a cutting blade 3C which can project from the opening 3a and enter the other recessed section 3b'. Small knurls P, P' may be formed as required on the opposing surfaces of the compression-and-heat sealing means 2, 2 and the compression-cooling and compression-cutting means 3, 3. The knurls act to promote heating and cooling of resin film which is compressed and held between these means. The compression-cooling and compression-cutting means 3, 3 are provided with cooling media 3d, 3d such as recirculating-water cooling.

The pair of compression-and-heat sealing means 2, 2 are mounted on upper support members 4, 4 and the pair of compression-cooling and compression-cutting 3, 3 are mounted on lower support members 5, 5.

Figure 2:
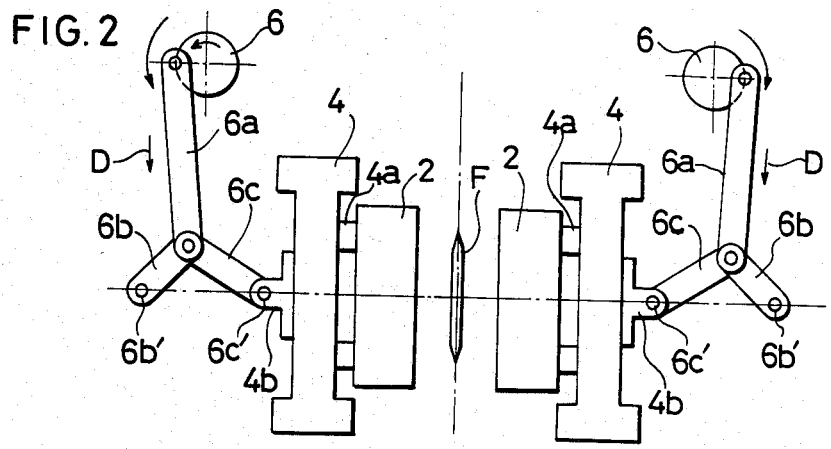
FIGS. 2 and 3 are top plans to illustrate the operation of the embodiment of the invention.
Figure 3:
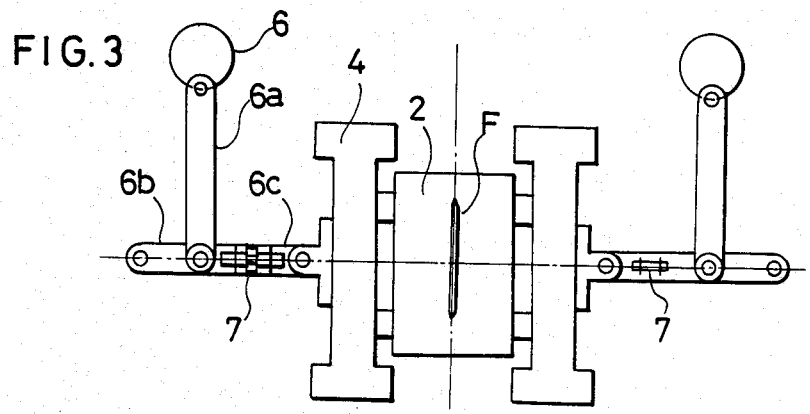

FIGS. 2 and 3 are the top plans of an embodiment including compression applying means of the invention, and since the compression applying means are the same in both the means 2, 2 and the means 3, 3, only the compression-and-heat sealing means 2, 2 will be described hereunder. The compression-and-heat sealing means 2, 2 are mounted on the upper support members 4, 4 through connecting media 4a, 4a. Separately, two cranks 6, 6 are disposed at fixed positions adjacent to the upper support members. To each crank 6, 6 is rotatably attached at its peripheral position a first link 6a, 6a, and to the end of each first link 6a, 6a opposite the connection with the crank 6, 6 is rotatably connected a second link 6b, 6b and a third link 6c, 6c. The end 6c' of each third link 6c, 6c opposite the connection with the first link 6a is rotatably connected to each of the upper support members 4, 4 through a connecting member 4b.

In order to pack and heat-seal a product in tubular resin film using the device described above, the compression-and-heat sealing means 2, 2, and the compression-cooling and compression-cutting means 3, 3 of this invention are used in place of the heat sealing means 14, 14 and of the cutting means 15, 15 of the prior art, respectively, in a way similar to that explained in reference to FIGS. 5(a), 5(b), 5(c) and 5(d).

As shown in FIG. 2, when tubular resin film F reaches the position between the pair of compression-and-heat sealing means 2, 2, the cranks 6, 6 rotate to move the first links 6a, 6a in the direction of arrows D, D so that the second links 6b, 6b and the third links 6c, 6c are caused to take a rectilinear position relative to each another. By this motion, the compression-and-heat sealing means 2, 2 hold therebetween the tubular resin film F and heat-seal it through the upper support members. The tubular resin film F after completing compression-and-heat sealing by the compression-and-heat sealing means 2, 2 is moved downward, and immediately held between the compression-cooling and compression-cutting means 3, 3 immediately below the compression-and-heat sealing means 2, 2, the heat-sealed portion of the film F being cut while being compressed and cooled.

The cranks 6, 6 are used for operating the first links 6a, 6a in the embodiment above, but hydraulic or pneumatic cylinders can be used instead. Length adjustment means 7, 7 such as bolts having reverse threads are preferably installed as required on the third links 6c, 6c (or the second links 6b, 6b). The compression applying mechanism using the crank 6 (or cylinder) and the first, second and third links 6a, 6b and 6c, respectively, can increase the compression force of the compression-and-heat sealing means 2, 2 and the compression-cooling and compression-cutting means 3, 3 almost infinitely.

What is claimed is:

1. A packed bag transverse sealing mechanism for use in a device for producing bag-packed products by charging products in tubular film and transversely sealing the film, said packed bag transverse sealing mechanism comprising a pair of compression-and-heat sealing means and a pair of compression-cooling and compression-cutting means disposed immediately below said compression-and-heat sealing means, both said means being for cutting the seal of a packed bag, characterized in that said compression-and-heat sealing means and said compression-cooling and compression-cutting means are respectively provided with a pair of link-bar mechanisms by which compression can be increased infinitely, said pair of compression-and-heat sealing means have heating media for heat-sealing, and said pair of compression-cooling and compression-cutting means have sealed portion cooling media and a recessed section on each of their opposing surfaces, in one recessed section being disposed a cutting blade which is adapted to project and retreat and to cut the sealed portion of said tubular film after compression-cooling.

2. A packed bag transverse sealing mechanism according to claim 1, wherein said link-bar mechanisms comprise a first link, one end of which is connected to a driving means and the other end of which is rotatably connected to one end of each of second and third links, the other end of said second link being rotatably supported at a fixed position and the other end of said third link being rotatably connected to said compression-and-heat sealing means or said compression-cooling and compression-cutting means so that said second and third links are adapted to approach the rectilinear position from the bent position relative to each another.

3. A packed bag transverse sealing mechanism for use in a device for producing bag-packed products by charging products in tubular film and transversely sealing the film, said packed bag transverse sealing mechanism comprising a pair of compression-and-heat sealing means and a pair of compression-cooling and compression-cutting means disposed immediately below said compression-and-heat sealing means, both said means being for cutting the seal of a packed bag, characterized in that said compression-and-heat sealing means and said compression-cooling and compression-cutting means are respectively provided with a pair of link-bar mechanisms by which compression can be increased infinitely, said pair of compression-and-heat sealing means have heating media for heat-sealing, and said pair of compression-cooling and compression-cutting means have sealed portion cooling media and a recessed section on each of their opposing surfaces, in one recessed section being disposed a cutting blade which is adapted to project and retreat and to cut the sealed portion of said tubular film after compression-cooling, said link-bar mechanisms comprising a first link, one end of which is connected to a driving means and the other end of which is rotatably connected to one end of each of second and third links, the other end of said second link being rotatably supported at a fixed position and the other end of said third link being rotatably connected to said compression-and-heat sealing means or said compression-cooling and compression-cutting means so that said second and third links are adapted to approach the rectilinear position from the bent position relative to each other, and said third link being equipped with a length adjustment means.

* * * * *